United States Patent
Li et al.

(10) Patent No.: US 11,133,871 B1
(45) Date of Patent: Sep. 28, 2021

(54) RECEIVING AND SENDING INTEGRATED CHIP FOR OLT

(71) Applicant: FUJIAN EOCHIP SEMICONDUCTOR CO., LTD, Fuzhou (CN)

(72) Inventors: Jinghu Li, Fuzhuo (CN); Zhang Fan, Fuzhuo (CN); Hanghui Tu, Fuzhuo (CN)

( * ) Notice: Subject to any disclaimer, the term of this patent is extended or adjusted under 35 U.S.C. 154(b) by 229 days.

(21) Appl. No.: 16/606,489

(22) PCT Filed: Apr. 17, 2018

(86) PCT No.: PCT/CN2018/083407
§ 371 (c)(1),
(2) Date: Dec. 10, 2019

(87) PCT Pub. No.: WO2018/192497
PCT Pub. Date: Oct. 25, 2018

(30) Foreign Application Priority Data

Apr. 18, 2017 (CN) .......................... 201710254103.4

(51) Int. Cl.
*H04B 10/40* (2013.01)
*H04Q 11/00* (2006.01)

(52) U.S. Cl.
CPC ......... *H04B 10/40* (2013.01); *H04Q 11/0067* (2013.01)

(58) Field of Classification Search
CPC . H04Q 11/0067; H04B 10/40; H04B 10/2575
See application file for complete search history.

(56) References Cited

U.S. PATENT DOCUMENTS 7,209,178 B1 * 4/2007 Lee .................... H04N 21/4122
348/513
7,215,891 B1 * 5/2007 Chiang .................. H04B 10/40
398/137

(Continued)

*Primary Examiner* — Dzung D Tran
(74) *Attorney, Agent, or Firm* — Novoclaims Patent Services LLC; Mei Lin Wong (57) ABSTRACT

A receiving and sending integrated chip for an OLT, which relates to the field of integrated circuits and optical communications. The present invention arms at resolving the problem of high production costs and long production cycle due to the fact that the functions of a limiting amplifier and a laser driver of a traditional OLT end optical module based on a GPON and an EPON are implemented by means of two circuit chips. The present invention provides two solutions. The first solution is designed based on the EPON, a transmitter threshold value configuration mode is that the threshold value configuration is implemented after an upper computer and a slave $I^2C$ circuit in the chip cooperate to complete electrifying, and LOS signal determination in a receiver can be automatically reset by means of a chip internal module. The second solution is designed based on the GPON, the transmitter threshold value configuration mode is that the threshold value configuration is implemented after the upper computer and the slave $I^2C$ circuit in the chip cooperate to complete electrifying, LOS signal determined in the receiver can be automatically reset by means of the chip internal module and can also by manually reset by means of chip external RESET signals in cooperation with a corresponding peripheral circuit, and LOS and SD signal output selection pins are arranged.

2 Claims, 3 Drawing Sheets

(56) References Cited

U.S. PATENT DOCUMENTS

2008/0292311 A1* 11/2008 Daghighian ........... H04B 10/40
    398/9
2010/0054754 A1* 3/2010 Miller ................... H04B 10/50
    398/162
2015/0086211 A1* 3/2015 Coffey ............... H04B 10/0795
    398/116
2015/0288454 A1* 10/2015 Meinherz ............... H04B 10/40
    398/25

* cited by examiner

RECEIVING AND SENDING INTEGRATED CHIP FOR OLT

BACKGROUND OF THE PRESENT INVENTION

Field of Invention

The present invention relates to the field of integrated circuits and optical communications, wherein an OLT transceiver integrated chip of the present invention is an OLT end transceiver integrated chip based on EPON and GPON. OLT (optical line terminal), EPON (Ethernet Passive Optical Network), GPON (Gigabit-Capable Passive Optical Network).

DESCRIPTION OF RELATED ARTS

According to an optical communication station equipment OLT, a burst LA (limiting amplifier) is configured to limiting amplifying electrical signals with different amplitudes from an upper stage TIA (transimpedance amplifier). The LA further comprises a LOS (Loss of Signal) module to determine whether the LA input signal is noise signal or a qualified electrical signal level in order to switch off or switch on the operation of the main channel. A continuous LD (laser driver) is configured to convert the data stream of the electrical signal into a modulated current driven laser light emitting light signal. The LD comprises a threshold configuration module incorporated with APC (Automatic Optical Power Control) module and ATC (Automatic Temperature Control) module for feedback control. The optical splitting value of GPON technology is greater than that of EPON technology while the upload speed and the download speed are different. Therefore, the OLT optical module based on GPON and the OLT optical module based on EPON are provided. The limiting amplifier and the functions of the laser driver of the traditional OLT optical modules based on GPON and EPON are implemented by two circuit chips, such that the production cost and the production cycle will be highly increased.

SUMMARY OF THE PRESENT INVENTION

The objective of the present invention is to solve the problem that the functions of the limiting amplifier and the laser driver of the traditional OLT end optical module based on GPON and EPON are implemented by means of two circuit chips to highly increase the production cost and long production cycle, wherein the present invention provides two types of OLT transceiver integrated chips to lower the manufacturing cost and improve the production efficiency.

The OLT transceiver integrated chip of the present invention includes two technical solutions.

According to the first technical solution, the OLT transceiver integrated chip is designed based on EPON, wherein the OLT transceiver integrated chip comprises a transmitter and a receiver.

The transmitter comprises an input buffer Buffer, an NPN transistor Q1, an NPN transistor Q2, I²C circuit of the I²C slave, a status register set, an analog-to-digital converter ADC, a digital-to-analog converter set, a digital-to-analog converter DAC1, a voltage comparator COMP, and a counter Counter, a voltage controlled current source VCCS1, a voltage controlled current source VCCS2 and resistor R1.

A position phase input terminal of the input buffer Buffer is connected to a positive input chip terminal TX_INP of the transmitter, and a negative phase input terminal of the input buffer Buffer is connected to a negative input chip terminal TX_INN of the transmitter.

A positive phase output terminal of the input buffer Buffer is connected to the base of the NPN transistor Q2, and a negative phase output terminal of the input buffer Buffer is connected to the base of the NPN transistor Q1.

A collector of the NPN transistor Q1 is connected to a negative output chip terminal TX_OUTP of the transmitter.

A collector of the NPN transistor Q2 is connected to a positive output chip terminal TX_OUTN of the transmitter.

An emitter of the NPN transistor Q1 and an emitter of the NPN transistor Q2 are connected to a positive terminal of the voltage controlled current source VCCS1 at the same time.

A signal clock end of an I²C circuit of the I²C slave is connected to a signal clock line SCL of the chip.

A signal data end of the I²C circuit of the I²C slave is connected to a data signal terminal SDA of the chip.

Another signal data end of the I²C circuit of the I²C slave is connected to an input-and-output terminal of the status register set $SR_S$.

An output of the analog-to-digital converter ADC is connected to an input of the status register set $SR_S$.

An output of the status register set $SR_S$ is connected to a digital signal input of DAC1.

Another output of the status register set $SR_S$ is connected to a digital signal input of the digital-to-analog converter set $DAC_S$.

An analog signal output end of the digital-to-analog converter DAC1 is connected to a positive phase input terminal of the voltage comparator COMP.

A negative phase input terminal of the voltage comparator COMP is connected to one end of the chip terminal I_MON and the resistor R1 at the same time.

An output of the voltage comparator COMP is connected to an input of the counter Counter.

An output of the counter Counter is connected to the digital signal input terminal of the digital-to-analog converter set $DAC_S$.

Two analog signal output ends of the digital-to-analog converter set $DAC_S$ are respectively connected to a signal control end of the voltage-controlled current source VCCS1 and a signal control end of the voltage-controlled current source VCCS2.

A positive terminal of the voltage controlled current source VCCS2 is connected to a bias current pin I_BIAS of the chip.

A negative terminal of the voltage controlled current source VCCS1, a negative terminal of the voltage controlled current source VCCS2, and another end of the resistor R1 are connected to a GND at the same time.

The receiver comprises a limiting amplifier LA, an output buffer Buffer0 having a switch Switch, an operational amplifier Level Detect, a voltage comparator COMP1, an inverter Inverter, a resistor Rref and a current source I1.

A positive phase input terminal of the limiting amplifier LA is connected to a positive input chip terminal RX_INP of the receiver, and a negative phase input terminal of the limiting amplifier LA is connected to a negative input chip terminal RX_INN of the receiver.

A positive phase output terminal of the limiting amplifier LA is connected to a positive phase input terminal of the output buffer Buffer0 and a positive phase input terminal of the operational amplifier Level Detect at the same time.

A negative phase output terminal of the limiting amplifier LA is connected to a negative phase input terminal of the output buffer Buffer0 and a negative phase input terminal of the operational amplifier Level Detect at the same time.

An output of the operational amplifier Level Detect is connected to a negative phase input terminal of the voltage comparator COMP1.

A positive input terminal of the voltage comparator COMP1 is connected to the threshold voltage terminal LOSTH in the chip which is configured for LOS signal determination.

An output of the voltage comparator COMP1 is connected to a LOS signal output terminal of the chip.

An input of the inverter Inverter is connected to an enable signal terminal EN of the receiver.

An output of the inverter Inverter is connected to the switch Switch in the output buffer Buffer0.

A positive phase output terminal of the output buffer Buffer0 is connected to a positive output chip terminal RX_OUTP of the receiver.

A negative phase output of the output buffer Buffer0 is connected to a negative output chip terminal RX_OUTN of the receiver.

One end of the resistor Rref is connected to a positive terminal of the current source I1 and a chip reference voltage pin Vref at the same time.

Another end of the resistor Rref is connected to the power source VDD.

A negative terminal of current source I1 is connected to the ground.

According to the second technical solution, The OLT transceiver integrated chip is designed based on GPON, wherein the OLT transceiver integrated chip comprises a transmitter and a receiver.

The transmitter comprises an input buffer Buffer, an NPN transistor Q1, an NPN transistor Q2, an I²C circuit of the I²C slave, a status register set $SR_S$, an analog-to-digital converter ADC, a digital-to-analog converter group $DAC_S$, a digital-to-analog converter DAC1, a voltage comparator COMP, and a counter Counter, a voltage controlled current source VCCS1, a voltage controlled current source VCCS2 and resistor R1.

A positive phase input terminal of the input buffer Buffer is connected to a positive input chip terminal TX_NP of the transmitter, and a negative phase input terminal of the input buffer Buffer is connected to a negative input chip terminal TX_INN of the transmitter.

A positive phase output terminal of the input buffer Buffer is connected to a base of the NPN transistor Q2, and a negative phase output terminal of the input buffer Buffer is connected to the base of the NPN transistor Q1.

A collector of the NPN transistor Q1 is connected to a negative output chip terminal TX_OUTP of the transmitter.

A collector of the NPN transistor Q2 is connected to a positive output chip terminal TX_OUTN of the transmitter.

An emitter of the NPN transistor Q1 is connected to an emitter of the NPN transistor Q2 and a positive terminal of the voltage controlled current source VCCS1 at the same time.

A signal clock end of the I²C circuit of the I²C slave is connected to a signal clock line SCL of the chip.

A signal data end of the I²C circuit of the I²C slave is connected to a data signal terminal SDA of the chip.

Another signal data end of the I²C circuit of the I²C slave is connected to an input-and-output terminal of the status register set $SR_S$.

An output of the analog-to-digital converter ADC is connected to an input of the status register set $SR_S$.

An output of the status register set $SR_S$ is connected to a digital signal input of DAC1.

Another output of the status register set $SR_S$ is connected to a digital signal input of the digital-to-analog converter set $DAC_S$.

An analog signal output end of the digital-to-analog converter DAC1 is connected to a positive phase input terminal of the voltage comparator COMP.

A negative phase input terminal of the voltage comparator COMP is connected to one end of the chip terminal I_MON and the resistor R1 at the same time.

An output of the voltage comparator COMP is connected to an input of the counter Counter.

An output of the counter Counter is connected to the digital signal input terminal of the digital-to-analog converter set $DAC_S$.

Two analog signal output ends of the digital-to-analog converter set $DAC_S$ are respectively connected to a signal control end of the voltage-controlled current source VCCS1 and a signal control end of the voltage-controlled current source VCCS2.

A positive terminal of the voltage controlled current source VCCS2 is connected to a bias current pin I_BIAS of the chip.

A negative terminal of the voltage controlled current source VCCS1, a negative terminal of the voltage controlled current source VCCS2, and another end of the resistor R1 are connected to the GND at the same time.

The receiver comprises an amplitude amplifier LA, an output buffer Buffer0, an operational amplifier Level Detect, a voltage comparator COMP1, an inverter Inverter, a selector S, an output buffer Buffer1, an AND-OR logic gate B, an OR logic gate D, an AND logic gate E, a capacitor C1, a capacitor C2, a resistor R4, a resistor R5, a resistor R8, a resistor R9, a switch switch3, a switch switch4, a resistor Rref and a current source I1.

A position phase input terminal of the limiting amplifier LA is connected to a positive input chip terminal RX_INP of the receiver, and a negative phase input terminal of the limiting amplifier LA is connected to a negative input chip terminal RX_INN of the receiver.

A positive phase output terminal of the limiting amplifier LA is connected to a positive phase input terminal of the output buffer Buffer0 and a positive phase input terminal of the operational amplifier Level Detect at the same time.

A negative phase output terminal of the limiting amplifier LA is connected to a negative phase input terminal of the output buffer Buffer0 and a negative phase input terminal of the operational amplifier Level Detect at the same time.

An output of the operational amplifier Level Detect is connected to a negative phase input terminal of the voltage comparator COMP1.

A positive input terminal of the voltage comparator COMP1 is connected to the threshold voltage terminal LOSTH in the chip which is configured for LOS signal determination.

An output of the voltage comparator COMP1 is connected to an input end of the AND logic gate E.

Another other input end of the AND logic gate E is connected to an automatic reset chip terminal AUTO RESET.

An input end of the OR logic gate D is connected to a manual reset chip pin RESET.

Another input end of the OR logic gate D is connected to an output end of the AND logic gate E.

The OR logic gate D is arranged to output a determination result from an input of an electrical signal amplitude of the receiver, wherein an output end of the OR logic gate D is connected to an input of the inverter Inverter and a LOS signal end of the selector S at the same time.

An output of the inverter Inverter is connected to a SD signal end of the selector S.

A channel selection switch switch1 of the selector S is connected to one input end of the AND-OR logic gate B and an electrical level selection terminal LOS/SDSEL external to the chip at the same time.

An output of the selector S is connected to the input end of the output buffer Buffer1.

An output of the output buffer Buffer1 is connected to a determination result chip terminal LOS/SD.

Another input end of the AND-OR logic gate B is connected to the chip terminal JAM, and is connected to the determination result chip terminal LOS/SD.

An output of the AND-OR logic gate B is connected to the switch Switch inside the output buffer Buffer0.

One end of the resistor Rref is connected to a positive terminal of the current source I1 and a chip reference voltage signal pin Vref at the same time.

Another end of the resistor Rref is connected to the power source VDD.

A negative terminal of current source I1 is connected to the ground.

One end of the capacitor C1 is connected to an output terminal of a transimpedance amplifier TIA.

One end of the capacitor C2 is connected to another output terminal of the transimpedance amplifier TIA.

Another end of the capacitor C1 is connected to one end of the resistor R5, one end of the resistor R9 and a positive input chip terminal RX_INP of the receiver at the same time.

Another end of the capacitor C2 is connected to one end of the resistor R4, one end of the resistor R8 and a negative input chip terminal RX_INN of receiver at the same time.

A chip reference voltage terminal Vref is connected to another end of the resistor R9, another end of the resistor R8, one end of the switch switch3, and one end of the switch switch4 at the same time.

Another end of the switch switch3 is connected to another end of the resistor R4.

Another end of the switch switch4 is connected to another end of the resistor R5.

A reset signal line RESET is connected to a chip manual reset terminal RESET, a control terminal of the switch switch3, and a control terminal of the switch switch4 at the same time.

The present invention has the following advantages: provide a transceiver integrated chip circuit structure for an OLT based on GPON to reduce number of chips being used for modulated manufacturers, so as to significantly increase the production efficiency and to reduce the production costs. In order to meet the strictly timing requirements, a rapid manual reset RESET is set in the receiver LOS response module inside the transceiver integrated chip circuit structure for an OLT based on GPON to reduce the data transmission latency.

DETAILED DESCRIPTION OF THE PREFERRED EMBODIMENT

Figure 1:
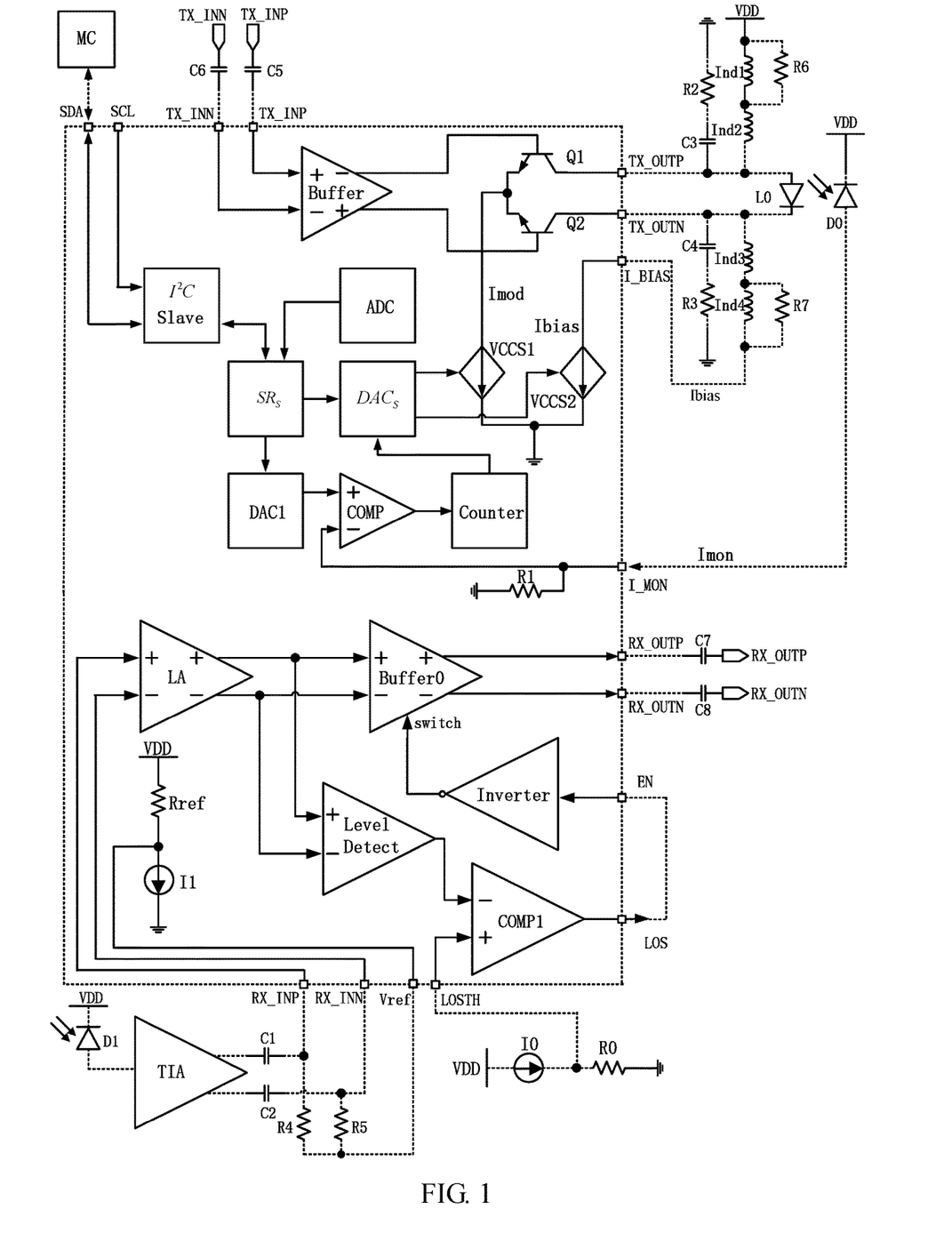
FIG. 1 is a circuit diagram of an OLT transceiver integrated chip based on EPON.

Embodiment 1: The following description is incorporated with FIG. 1 to illustrate a transceiver integrated chip for an OLT based on EPON according to the present invention, wherein the working principle is shown as follows:

The laser device used in fiber optic communication must be set in an offset manner adjacent to the threshold to enable the current being rapidly increased to activate the laser device. Therefore, the laser driver must provide a bias current Ibias and a modulation current Imod. For temperature changes and aging of the laser device, it generally requires a self-adapted bias current Ibias, wherein the modulation current Imod is generally constant.

The data stream is input from the terminals TX_INP and TX_INN of the chip to positive and negative terminals of the buffering device. Two output terminals of the buffering device are respectively connected to bases of NPN transistors Q1 and Q2 to control the two transistors in an on-and-off state and to generate a current at their collectors in an alternating manner so as to control the illumination and switch-off of the laser device Lo external to the chip. The total modulation current Imod is an emitter current of the NPN transistors Q1 and Q2. The monitoring photodiode D0 is arranged to receive a light emitted by the laser device LO and is configured to produce a monitoring current Imon.

After the chip is powered on, a host computer MC is incorporated with a serial clock line SCL, wherein an initial digital threshold (e.g. modulated electrical modulation current threshold, bias current threshold, average optical power threshold, temperature threshold, etc. . . . ) is written into a $SR_S$ register set through an I$^2$C circuit of the I$^2$C slave in the chip. The digital threshold of the $SR_S$ register set is sent to the $DAC_S$ digital-to-analog converter set in order to convert the digital threshold to an analog threshold. The output of the $DAC_S$ digital-to-analog converter set serves as a controlling signal line to control the voltage controlled signal lines of the voltage controlled current sources VCCS1 and VCCS2, to complete the configuration of modulation current Imod and the bias current Ibias.

The digital threshold of an average optical power is sent to the $SR_S$ register set, and converted to the DAC1 digital-to-analog converter to form an analog threshold. The output of the digital-to-analog converter DAC1 is connected to the positive phase input of a voltage comparator COMP in order to compare the current formed the Imon monitoring current with a current formed by R1. If the Imon monitoring current is greater than the analog threshold, the comparator COMP is configured to output a low electrical level. If the Imon monitoring current is smaller than the analog threshold, the comparator COMP is configured to output a high electrical level. The result generated by the comparator COMP is input into a multi-bit counter, and the counter is continuously incremented and deducted by one with a clock tick to adjust the input amount of the $DAC_S$ digital-to-analog converter set. The analog amount output by the digital-to-analog converter set is also adjusted at the same time to control the magnitude of the current Ibias passing through the voltage-controlled current source VCCS2, so as to complete an automatic optical power control (APC).

The ADC is configured to convert the information actually operating inside the chip, such as bias current, modulation current, monitor current, ambient temperature, etc . . . , from the analog form to the digital form, and then to send to the corresponding register in the $SR_S$ register set. The host computer MC is able to read the chip information in the $SR_S$ register set through the $I^2C$ circuit of the $I^2C$ slave in the chip. The chip operator is able to compare and optimize the chip information. After the modification, the modified digital threshold is configured to pass through the $I^2C$ circuit of the $I^2C$ slave again to write in the $SR_S$ register set in order to overwrite the previous digital threshold saved through the $I^2C$ circuit of the $I^2C$ slave.

The configuration of the transmitter of the transceiver integrated chip of the OLT based on EPON is that the host device MC external to the chip incorporating with the $I^2C$ circuit of the $I^2C$ slave in the chip to complete the threshold configuration after power-on, EPON-based transmitter threshold configuration in an OLT transceiver integrated chip. The optimized threshold configuration can be completed again through the $I^2C$ circuit of the $I^2C$ slave inside the chip after the operation of chip, so as to finally obtain a reasonable total current of the laser device Lo.

The two positive and negative phase input ends of LA of the receiver are configured to receive the output voltage from the previous stage TIA (transimpedance amplifier). After amplification by the LA, the amplified voltage is transmitted to the level detector for voltage level detection. By adjusting a resistance of an external resistance Ro of the chip, different LOS threshold voltages are obtained. Such voltages are transmitted to the positive phase input of the voltage comparator COMP1 through the chip terminal LOSTH.

1. If the output of the level detector, i.e. is the voltage of the inverting input of the voltage comparator COMP1, is smaller than the LOS threshold voltage, the voltage comparator COMP1 is arranged to output a high electrical level. The chip terminal LOS is at a high electrical level, and the chip terminal EN connected thereto is also at a high electrical level. The high level signal is configured to pass through the inverter to output a low electrical level in order to control a switch Switch of a main channel of the output buffer Buffer0 for switching off the data transmission of the main channel.

2. If the output of the level detector, i.e. is the voltage of the inverting input of the voltage comparator COMP1, is greater than the LOS threshold voltage, the voltage comparator COMP1 is arranged to output a low electrical level. The chip terminal LOS is at a low electrical level, and the chip terminal EN connected thereto is also at a low electrical level. The low level signal is configured to pass through the inverter to output a low electrical level in order to control the switch Switch of the main channel of the output buffer Buffer0 for switching on the data transmission of the main channel.

The chip terminal Vref is configured to ground the capacitors C1 and C2, which are connected to the two input ends of LA, for charge discharging, so as to rebuild an action of a DC operating point.

Figure 2:
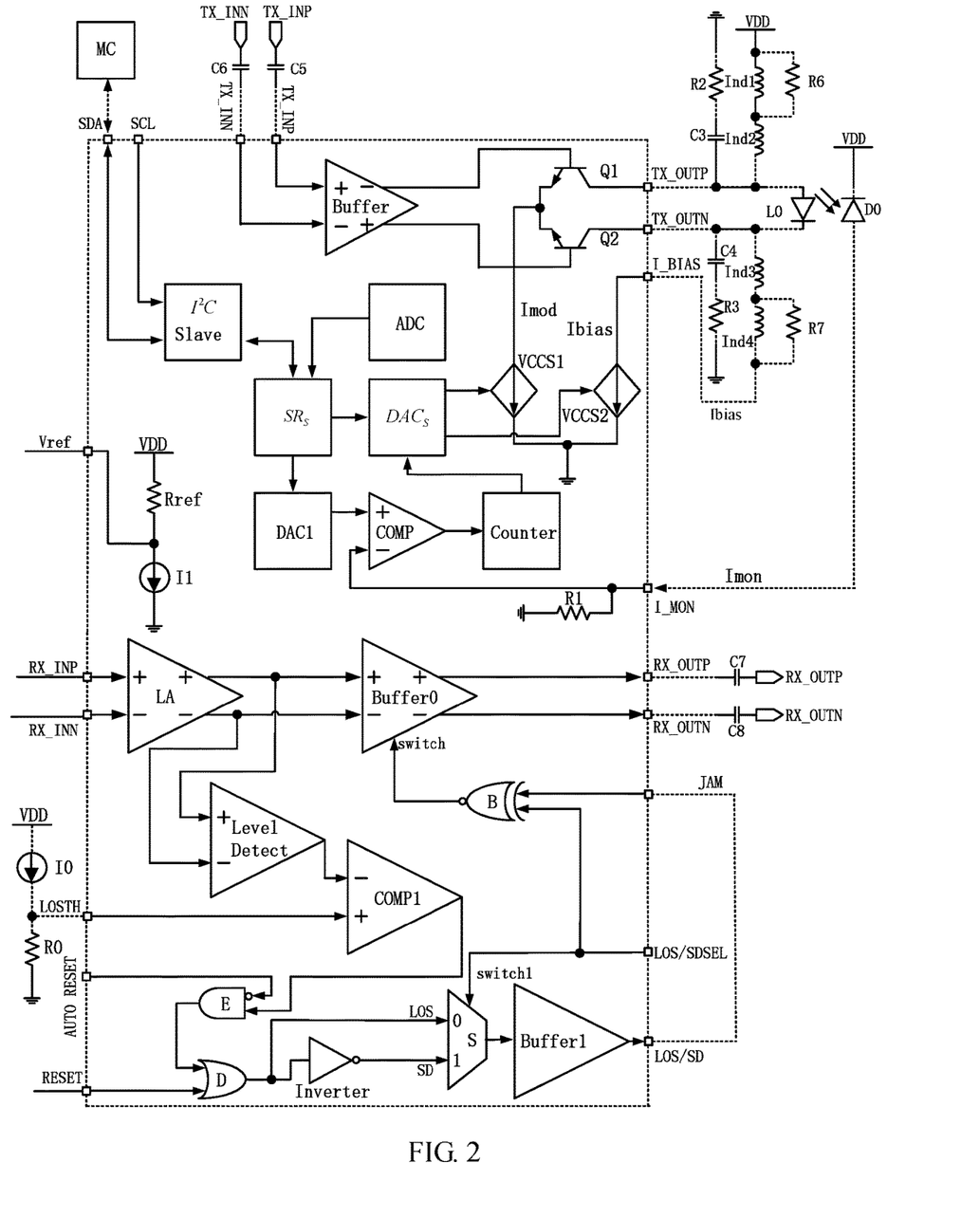
FIG. 2 is a circuit diagram of an OLT transceiver integrated chip based on GPON.
Figure 3:
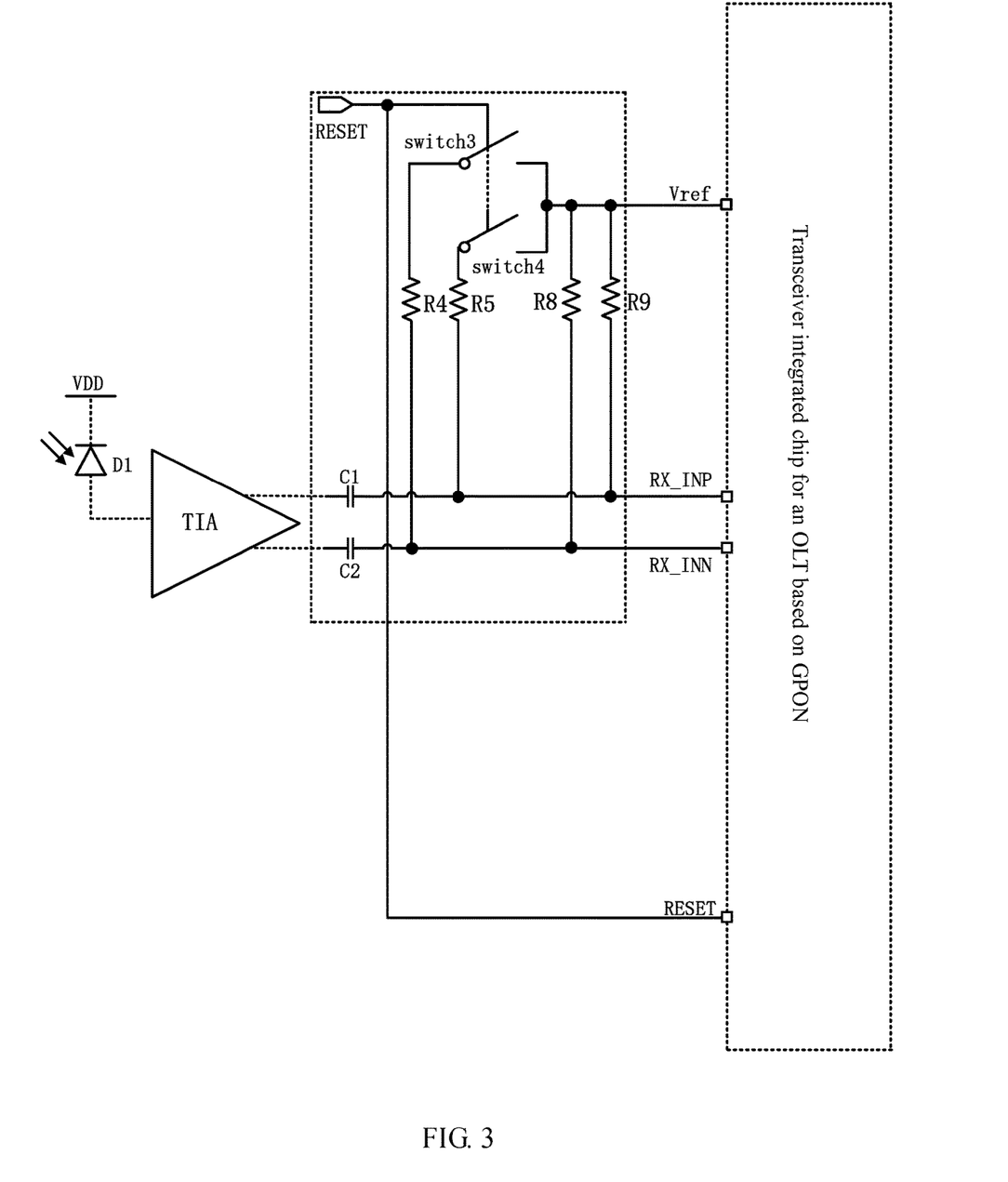
FIG. 3 is circuit diagram of a peripheral circuit for the OLT transceiver integrated chip based on EPON.

Embodiment 2: The following description is incorporated with FIGS. 2 and 3 to illustrate a transceiver integrated chip for an OLT based on GPON according to the present invention. FIG. 2 illustrates the circuit diagram of the transceiver integrated chip for an OLT based on GPON. FIG. 3 illustrates a peripheral circuit for the transceiver integrated chip for an OLT based on GPON.

The working principle is shown as follows:

The laser device used in fiber optic communication must be set in an offset manner adjacent to the threshold to enable the current being rapidly increased to activate the laser device. Therefore, the laser driver must provide a bias current Ibias and a modulation current Imod. For temperature changes and aging of the laser device, it generally requires a self-adapted bias current Ibias, wherein the modulation current Imod is generally constant.

The data stream is input from the terminals TX_INP and TX_INN of the chip to positive and negative terminals of the buffering device. Two output terminals of the buffering device are respectively connected to bases of NPN transistors Q1 and Q2 to control the two transistors in an on-and-off state and to generate a current at their collectors in an alternating manner so as to control the illumination and switch-off of the laser device Lo external to the chip. The total modulation current Imod is an emitter current of the NPN transistors Q1 and Q2. The monitoring photodiode D0 is arranged to receive a light emitted by the laser device LO and is configured to produce a monitoring current Imon.

After the chip is powered on, a host computer MC is incorporated with a serial clock line SCL, wherein an initial digital threshold (e.g. modulated electrical modulation current threshold, bias current threshold, average optical power threshold, temperature threshold, etc. . . . ) is written into a $SR_S$ register set through an $I^2C$ circuit of the $I^2C$ slave in the chip. The digital threshold of the $SR_S$ register set is sent to the $DAC_S$ digital-to-analog converter set in order to convert the digital threshold to an analog threshold. The output of the $DAC_S$ digital-to-analog converter set serves as a controlling signal line to control the voltage controlled signal lines of the voltage controlled current sources VCCS1 and VCCS2, to complete the configuration of modulation current Imod and the bias current Ibias.

The digital threshold of an average optical power is sent to the $SR_S$ register set, and converted to the DAC1 digital-to-analog converter to form an analog threshold. The output of the digital-to-analog converter DAC1 is connected to the positive phase input of a voltage comparator COMP in order to compare the current formed the Imon monitoring current with a current formed by R1. If the Imon monitoring current is greater than the analog threshold, the comparator COMP is configured to output a low electrical level. If the Imon monitoring current is smaller than the analog threshold, the comparator COMP is configured to output a high electrical level. The result generated by the comparator COMP is input into a multi-bit counter, and the counter is continuously incremented and deducted by one with a clock tick to adjust the input amount of the $DAC_S$ digital-to-analog converter set. The analog amount output by the digital-to-analog converter set is also adjusted at the same time to control the magnitude of the current Ibias passing through the voltage-controlled current source VCCS2, so as to complete an automatic optical power control (APC).

The ADC is configured to convert the information actually operating inside the chip, such as bias current, modulation current, monitor current, ambient temperature, etc . . . , from the analog form to the digital form, and then to send to the corresponding register in the $SR_S$ register set. The host computer MC is able to read the chip information in the $SR_S$ register set through the $I^2C$ circuit of the $I^2C$ slave in the chip. The chip operator is able to compare and optimize the chip information. After the modification, the modified digital threshold is configured to pass through the $I^2C$ circuit of the $I^2C$ slave again to write in the $SR_S$ register set in order to overwrite the previous digital threshold saved through the $I^2C$ circuit of the $I^2C$ slave.

The configuration of the transmitter of the transceiver integrated chip of the OLT based on GPON is that the host device MC external to the chip incorporating with the $I^2C$ circuit of the I²C slave in the chip to complete the threshold configuration after power-on, EPON-based transmitter threshold configuration in an OLT transceiver integrated chip. The optimized threshold configuration can be completed again through the I²C circuit of the I²C slave inside the chip after the operation of chip, so as to finally obtain a reasonable total current of the laser device Lo.

The two positive and negative phase input ends of LA of the receiver are configured to receive the output voltage from the previous stage TIA (transimpedance amplifier). After amplification by the LA, the amplified voltage is transmitted to the level detector for voltage level detection. By adjusting a resistance of an external resistance Ro of the chip, different LOS threshold voltages are obtained. Such voltages are transmitted to the negative phase input of the voltage comparator COMP1 through the chip terminal LOSTH. The chip terminal LOS/SDSEL is connected to an external voltage to adjust the high and low electrical levels in order to control the channel selection of the internal selector S.

1. When the electrical level of the chip terminal LOS/SDSEL is low, the LOS channel of the channel selector S is switched on and the electrical level of the input of the AND-OR logic gate B is also low.

① If the output of the level detector, i.e. the voltage of the inverting input of the voltage comparator COMP1, is greater than the LOS threshold voltage, the voltage comparator COMP1 is arranged to output a low electrical level.

No matter the electrical level of the chip terminal AUTO RESET is high or low, the output of the electrical level of the AND logic gate E will always be low. Under such circumstance, the electrical level of the chip terminal RESET will never be high and will only be low, such that the OR logic gate D is arranged to output a low electrical level, that is, the LOS signal line of selector S. The output of the electrical level of the selector S is low, the output of the electrical level of buffer Buffer1 is low, and the electrical level of the chip terminal LOS/SD is also low. The chip terminal LOS/SD is connected to the chip terminal JAM through the external conductive wire of the chip. Finally, both the two inputs of the AND-OR logic gate B are low electrical level and are arranged to output a high electrical level to control the output of the buffer Buffer0 in order to control the switch Switch for switching on the data transmission of the main channel.

② If the output of the level detector, i.e. is the voltage of the inverting input of the voltage comparator COMP1, is smaller than the LOS threshold voltage, the voltage comparator COMP1 is arranged to output a high electrical level.

When the electrical level of the chip terminal AUTO RESET is low, the output of the electrical level of the AND logic gate E is high. The signal speed at one input of the chip terminal RESET corresponding to the OR logic gate D is faster than the other input corresponding to the output of the AND logic gate E. When the electrical level of the chip terminal RESET is low, the OR logic gate D is arranged to respond to the output of the AND gate E and the output is high electrical level that such process has a longer response time. Before the OR logic gate D responds to the high electrical level of the AND logic gate E, if the electrical level of the chip terminal RESET is suddenly increased to a high level, the OR logic gate D will respond to the high level input of chip terminal RESET and will output a high electrical level that such process has a shorter response time.

When the electrical level of the chip terminal AUTO RESET is high, the output of the electrical level of the AND logic gate E is low. The AUTO RESET function inside the chip is switched off to only respond to the manual reset RESET signal. Only when the electrical level of the chip terminal RESET is high, the OR logic gate D will rapidly respond to an automatic reset signal RESET and output a high electrical level.

Finally, the electrical level of the LOS signal input of selector S is high, the electrical level of output of the selector S is high, the electrical level of the output of the buffer Buffer1 is high, and the electrical level of the chip terminal LOS/SD is also high. The chip terminal LOS/SD is connected to the chip terminal JAM through the external conductive wire of the chip. Finally, the two inputs of the AND-OR logic gate B are high and low electrical levels respectively and are arranged to output a high electrical level to control the output of the buffer Buffer0 in order to control the switch Switch for switching off the data transmission of the main channel.

2. When the electrical level of the chip terminal LOS/SDSEL is high, the SD channel of the channel selector S is switched on and the electrical level of the input of the AND-OR logic gate B is also high.

① If the output of the level detector, i.e. the voltage of the inverting input of the voltage comparator COMP1, is greater than the LOS threshold voltage, the voltage comparator COMP1 is arranged to output a low electrical level.

No matter the electrical level of the chip terminal AUTO RESET is high or low, the output of the electrical level of the AND logic gate E will always be low. Under such circumstance, the electrical level of the chip terminal RESET will never be high and will only be low, such that the OR logic gate D is arranged to output a low electrical level. The electrical level of the SD signal line of the selector S is high. The output of the electrical level of the selector S is high, the output of the electrical level of buffer Buffer1 is high, and the electrical level of the chip terminal LOS/SD is also high. The chip terminal LOS/SD is connected to the chip terminal JAM through the external conductive wire of the chip. Finally, both the two inputs of the AND-OR logic gate B are high electrical level and are arranged to output a high electrical level to control the output of the buffer Buffer0 in order to control the switch Switch for switching on the data transmission of the main channel.

② If the output of the level detector, i.e. is the voltage of the inverting input of the voltage comparator COMP1, is smaller than the LOS threshold voltage, the voltage comparator COMP1 is arranged to output a high electrical level.

When the electrical level of the chip terminal AUTO RESET is low, the output of the electrical level of the AND logic gate E is high. The signal speed at one input of the chip terminal RESET corresponding to the OR logic gate D is faster than the other input corresponding to the output of the AND logic gate E. When the electrical level of the chip terminal RESET is low, the OR logic gate D is arranged to respond to the output of the AND gate E and the output is high electrical level that such process has a longer response time. Before the OR logic gate D responds to the high electrical level of the AND logic gate E, if the electrical level of the chip terminal RESET is suddenly increased to a high level, the OR logic gate D will respond to the high level input of chip terminal RESET and will output a high electrical level that such process has a shorter response time.

When the electrical level of the chip terminal AUTO RESET is high, the output of the electrical level of the AND logic gate E is low. The AUTO RESET function inside the chip is switched off to only respond to the manual reset RESET signal. Only when the electrical level of the chip terminal RESET is high, the OR logic gate D will rapidly respond to an automatic reset signal RESET and output a high electrical level.

Finally, the electrical level of the LOS signal input of selector S is low, the electrical level of output of the selector S is low, the electrical level of the output of the buffer Buffer1 is low, and the electrical level of the chip terminal LOS/SD is high. The chip terminal LOS/SD is connected to the chip terminal JAM through the external conductive wire of the chip. Finally, the two inputs of the AND-OR logic gate B are high and low electrical levels respectively and are arranged to output a high electrical level to control the output of the buffer Buffer0 in order to control the switch Switch for switching off the data transmission of the main channel.

The chip terminal Vref is configured to ground the capacitors C1 and C2, which are connected to the two input ends of LA, for charge discharging. When the reset signal line RESET is set as 0, the switch Switch3 and the switch Switch4 are cut off, such that the charges at the capacitors are slowly discharged to the ground through the resistors R8 and R9 (large resistance value). When the reset signal line RESET is set as 1, the switch Switch3 and the switch Switch4 are switched on, such that the charges at the capacitors are rapidly discharged to the ground through the resistors R4 and R5 (small resistance value), so as to rebuild an action of a DC operating point.

The chip operator is able to select the LOS signal line or the SD signal line by adjusting the high-low electrical level of the chip terminal LOS/SDSEL. When the receiver completely receives the data, the chip is able to detect the electrical level signal through the internal module for performing a switch-off operation of the output of the buffer Buffer0. It is also able to rapidly switch off the output of the buffer Buffer0 through the high electrical level of the chip terminal RESET.

What is claimed is:

1. A transceiver integrated chip for an OLT, which is characterized in that the transceiver integrated chip is based on EPON, comprising a transmitter and a receiver, the transmitter comprising an input buffer Buffer, an NPN transistor Q1, an NPN transistor Q2, I²C circuit of the I²C slave, a status register set, an analog-to-digital converter ADC, a digital-to-analog converter set, a digital-to-analog converter DAC1, a voltage comparator COMP, and a counter Counter, a voltage controlled current source VCCS1, a voltage controlled current source VCCS2 and resistor R1;

a position phase input terminal of the input buffer Buffer connected to a positive input chip terminal TX_INP of the transmitter, and a negative phase input terminal of the input buffer Buffer connected to a negative input chip terminal TX_INN of the transmitter;

a positive phase output terminal of the input buffer Buffer connected to the base of the NPN transistor Q2, and a negative phase output terminal of the input buffer Buffer connected to the base of the NPN transistor Q1;

a collector of the NPN transistor Q1 connected to a negative output chip terminal TX_OUTP of the transmitter;

a collector of the NPN transistor Q2 connected to a positive output chip terminal TX_OUTN of the transmitter;

an emitter of the NPN transistor Q1 and an emitter of the NPN transistor Q2 being connected to a positive terminal of the voltage controlled current source VCCS1 at the same time;

a signal clock end of an I²C circuit of the I²C slave connected to a signal clock line SCL of the chip;

a signal data end of the I²C circuit of the I²C slave connected to a data signal terminal SDA of the chip;

another signal data end of the I²C circuit of the I²C slave connected to an input-and-output terminal of the status register set $SR_S$;

an output of the analog-to-digital converter ADC connected to an input of the status register set $SR_S$;

an output of the status register set $SR_S$ connected to a digital signal input of DAC1;

another output of the status register set $SR_S$ connected to a digital signal input of the digital-to-analog converter set $DAC_S$;

an analog signal output end of the digital-to-analog converter DAC1 connected to a positive phase input terminal of the voltage comparator COMP;

a negative phase input terminal of the voltage comparator COMP connected to one end of the chip terminal I_MON and the resistor R1 at the same time;

an output of the voltage comparator COMP connected to an input of the counter Counter;

an output of the counter Counter connected to the digital signal input terminal of the digital-to-analog converter set $DAC_S$;

two analog signal output ends of the digital-to-analog converter set $DAC_S$ being respectively connected to a signal control end of the voltage-controlled current source VCCS1 and a signal control end of the voltage-controlled current source VCCS2;

a positive terminal of the voltage controlled current source VCCS2 connected to a bias current pin I_BIAS of the chip;

a negative terminal of the voltage controlled current source VCCS1, a negative terminal of the voltage controlled current source VCCS2, and another end of the resistor R1 being connected to a GND at the same time;

the receiver comprising a limiting amplifier LA, an output buffer Buffer0 having a switch Switch, an operational amplifier Level Detect, a voltage comparator COMP1, an inverter Inverter, a resistor Rref and a current source I1;

a positive phase input terminal of the limiting amplifier LA connected to a positive input chip terminal RX_INP of the receiver, and a negative phase input terminal of the limiting amplifier LA connected to a negative input chip terminal RX_INN of the receiver;

a positive phase output terminal of the limiting amplifier LA connected to a positive phase input terminal of the output buffer Buffer0 and a positive phase input terminal of the operational amplifier Level Detect at the same time;

a negative phase output terminal of the limiting amplifier LA connected to a negative phase input terminal of the output buffer Buffer0 and a negative phase input terminal of the operational amplifier Level Detect at the same time;

an output of the operational amplifier Level Detect connected to a negative phase input terminal of the voltage comparator COMP1;

a positive input terminal of the voltage comparator COMP1 connected to the threshold voltage terminal LOSTH in the chip which is configured for LOS signal determination;

an output of the voltage comparator COMP1 connected to a LOS signal output terminal of the chip;

an input of the inverter Inverter connected to an enable signal terminal EN of the receiver;

an output of the inverter Inverter connected to the switch Switch in the output buffer Buffer0;

a positive phase output terminal of the output buffer Buffer0 connected to a positive output chip terminal RX_OUTP of the receiver;

a negative phase output of the output buffer Buffer0 connected to a negative output chip terminal RX_OUTN of the receiver;

one end of the resistor Rref connected to a positive terminal of the current source I1 and a chip reference voltage pin Vref at the same time;

another end of the resistor Rref connected to the power source VDD;

a negative terminal of current source I1 is connected to the ground.

2. A transceiver integrated chip for an OLT, as recited in claim 1, which is characterized in that the transceiver integrated chip is based on GPON, comprising a transmitter and a receiver;

the transmitter comprising an input buffer Buffer, an NPN transistor Q1, an NPN transistor Q2, an I²C circuit of the I²C slave, a status register set $SR_S$, an analog-to-digital converter ADC, a digital-to-analog converter group $DAC_S$, a digital-to-analog converter DAC1, a voltage comparator COMP, and a counter Counter, a voltage controlled current source VCCS1, a voltage controlled current source VCCS2 and resistor R1;

a positive phase input terminal of the input buffer Buffer connected to a positive input chip terminal TX_INP of the transmitter, and a negative phase input terminal of the input buffer Buffer connected to a negative input chip terminal TX_INN of the transmitter;

a positive phase output terminal of the input buffer Buffer connected to a base of the NPN transistor Q2, and a negative phase output terminal of the input buffer Buffer connected to the base of the NPN transistor Q1;

a collector of the NPN transistor Q1 connected to a negative output chip terminal TX_OUTP of the transmitter;

a collector of the NPN transistor Q2 connected to a positive output chip terminal TX_OUTN of the transmitter;

an emitter of the NPN transistor Q1 connected to an emitter of the NPN transistor Q2 and a positive terminal of the voltage controlled current source VCCS1 at the same time;

a signal clock end of the I²C circuit of the I²C slave connected to a signal clock line SCL of the chip;

a signal data end of the I²C circuit of the I²C slave connected to a data signal terminal SDA of the chip;

another signal data end of the I²C circuit of the I²C slave connected to an input-and-output terminal of the status register set $SR_S$;

an output of the analog-to-digital converter ADC connected to an input of the status register set $SR_S$;

an output of the status register set $SR_S$ connected to a digital signal input of DAC1;

another output of the status register set $SR_S$ connected to a digital signal input of the digital-to-analog converter set $DAC_S$;

an analog signal output end of the digital-to-analog converter DAC1 connected to a positive phase input terminal of the voltage comparator COMP;

a negative phase input terminal of the voltage comparator COMP connected to one end of the chip terminal I_MON and the resistor R1 at the same time;

an output of the voltage comparator COMP connected to an input of the counter Counter;

an output of the counter Counter connected to the digital signal input terminal of the digital-to-analog converter set $DAC_S$;

two analog signal output ends of the digital-to-analog converter set $DAC_S$ being respectively connected to a signal control end of the voltage-controlled current source VCCS1 and a signal control end of the voltage-controlled current source VCCS2;

a positive terminal of the voltage controlled current source VCCS2 connected to a bias current pin I_BIAS of the chip;

a negative terminal of the voltage controlled current source VCCS1, a negative terminal of the voltage controlled current source VCCS2, and another end of the resistor R1 being connected to a GND at the same time;

the receiver comprising an amplitude amplifier LA, an output buffer Buffer0, an operational amplifier Level Detect, a voltage comparator COMP1, an inverter Inverter, a selector S, an output buffer Buffer1, an AND-OR logic gate B, an OR logic gate D, an AND logic gate E, a capacitor C1, a capacitor C2, a resistor R4, a resistor R5, a resistor R8, a resistor R9, a switch switch3, a switch switch4, a resistor Rref and a current source I1;

a position phase input terminal of the limiting amplifier LA connected to a positive input chip terminal RX_INP of the receiver, and a negative phase input terminal of the limiting amplifier LA connected to a negative input chip terminal RX_INN of the receiver;

a positive phase output terminal of the limiting amplifier LA connected to a positive phase input terminal of the output buffer Buffer0 and a positive phase input terminal of the operational amplifier Level Detect at the same time;

a negative phase output terminal of the limiting amplifier LA connected to a negative phase input terminal of the output buffer Buffer0 and a negative phase input terminal of the operational amplifier Level Detect at the same time;

an output of the operational amplifier Level Detect connected to a negative phase input terminal of the voltage comparator COMP1;

a positive input terminal of the voltage comparator COMP1 connected to the threshold voltage terminal LOSTH in the chip which is configured for LOS signal determination;

an output of the voltage comparator COMP1 connected to an input end of the AND logic gate E;

another other input end of the AND logic gate E connected to an automatic reset chip terminal AUTO RESET;

an input end of the OR logic gate D connected to a manual reset chip pin RESET;

another input end of the OR logic gate D connected to an output end of the AND logic gate E;

the OR logic gate D arranged to output a determination result from an input of an electrical signal amplitude of the receiver, wherein an output end of the OR logic gate D is connected to an input of the inverter Inverter and a LOS signal end of the selector S at the same time;

an output of the inverter Inverter connected to a SD signal end of the selector S;

a channel selection switch switch1 of the selector S connected to one input end of the AND-OR logic gate B and an electrical level selection terminal LOS/SD-SEL external to the chip at the same time;

an output of the selector S connected to the input end of the output buffer Buffer1;

an output of the output buffer Buffer1 connected to a determination result chip terminal LOS/SD;

another input end of the AND-OR logic gate B connected to the chip terminal JAM, and connected to the determination result chip terminal LOS/SD;

an output of the AND-OR logic gate B connected to the switch Switch inside the output buffer Buffer0;

one end of the resistor Rref connected to a positive terminal of the current source I1 and a chip reference voltage signal pin Vref at the same time;

another end of the resistor Rref connected to the power source VDD;

a negative terminal of current source I1 connected to the ground;

one end of the capacitor C1 connected to an output terminal of a transimpedance amplifier TIA;

one end of the capacitor C2 connected to another output terminal of the transimpedance amplifier TIA;

another end of the capacitor C1 connected to one end of the resistor R5, one end of the resistor R9 and a positive input chip terminal RX_INP of the receiver at the same time;

another end of the capacitor C2 connected to one end of the resistor R4, one end of the resistor R8 and a negative input chip terminal RX_INN of receiver at the same time;

a chip reference voltage terminal Vref is connected to another end of the resistor R9, another end of the resistor R8, one end of the switch switch3, and one end of the switch switch4 at the same time;

another end of the switch switch3 connected to another end of the resistor R4;

another end of the switch switch4 connected to another end of the resistor R5;

a reset signal line RESET connected to a chip manual reset terminal RESET, a control terminal of the switch switch3, and a control terminal of the switch switch4 at the same time.

* * * * *